Patented Dec. 23, 1924.

1,520,673

UNITED STATES PATENT OFFICE.

GEORGE B. WALDEN, OF FRANKLIN, INDIANA, ASSIGNOR, BY MESNE ASSIGNMENTS, TO THE GOVERNORS OF THE UNIVERSITY OF TORONTO, OF TORONTO, ONTARIO, CANADA.

PURIFIED ANTIDIABETIC PRODUCT AND PROCESS OF MAKING IT.

No Drawing. Continuation of application Serial No. 622,448, filed March 2, 1923. This application filed June 11, 1924. Serial No. 719,269.

*To all whom it may concern:*

Be it known that I, GEORGE B. WALDEN, a citizen of the United States, residing at Franklin, in the county of Johnson and State of Indiana, have invented a new and useful Purified Antidiabetic Product and Process of Making It, of which the following is a specification.

This application is a substitute for and a continuation of my patent application Serial No. 622,448, filed March 2, 1923, allowed October 29, 1923, renewed April 30, 1924, and reallowed May 29, 1924.

It is the object of my invention to obtain in stable and very pure form the active anti-diabetic principle or hormone normally secreted by the pancreas of animals; by isolating it much more completely than has heretofore been possible from contaminating and deleterious substances, largely nitrogenous, with which it is associated in the pancreas and from which it has been impossible prior to my invention to separate it with anything like the completeness which I now attain.

Moreover, it is the object of my invention to provide a suitable method of extraction and an efficient method of purification, by which an anti-diabetic substance having the physiological and therapeutic characteristics and reactions of the active anti-diabetic principle or hormone of the pancreas may be obtained in purified and stable form, and substantially free of the substances with which it was originally associated in the pancreas; which method comprises treating the pancreas to leave behind the enzymes of the pancreas or inhibit their destructive action, separating the active anti-diabetic principle free of the major part of the substances, largely nitrogenous, with which it was originally associated, and then purifying this active anti-diabetic principle by reducing the residual-nitrogen content to a point where it is not in excess of 0.1 milligrams per unit of anti-diabetic activity.

It has long been believed that the pancreas,—including the pancreas of land animals and cartilaginous fishes, and the related glands (principal islets) of bony fishes,—normally produces, as an internal secretion, an active principle or hormone which is essential to the metabolism of sugar in the animal body, and that diabetes mellitus ensues when this secretion fails or becomes insufficient. Investigators sought in vain for years to derive this active principle or hormone from the pancreas in a form that could be administered with safety and would be effective in relieving the diabetic syndrome when used for human administration, but it was not until the work of Banting, Best and Collip, done at the University of Toronto, that such a product was derived, as set forth in their Patent No. 1,469,994, granted October 9, 1923.

Very briefly their process involves the following main steps:—

1. The extraction of the ground pancreas,—before any considerable quantity of the anti-diabetic hormone therein has been destroyed by trypsin and other enzymes of the pancreas,—with a suitable solvent that extracts such hormone and either leaves behind the destructive enzymes such as trypsin or inhibits their destructive action on the anti-diabetic hormone, or both;

2. The variation of the solvent-concentration of the solution, either with the original solvent or a different one or both, in order to separate by fractional precipitation and proper filtration, various components originally extracted. Alcohol has been successfully used for the fractional precipitation; and the precipitate which is obtained between 80% and 90% alcohol concentration, after the previous removal of precipitates obtained on lower alcohol concentration, contains at least part of the desired anti-diabetic hormone;

3. The solution in water of this hormone-containing precipitate, which was obtained on 80% to 90% alcohol concentration; and 4. The standardization of the anti-diabetic activity of the solution thus obtained. Although other units of activity may be used, the unit of activity hereinafter referred to as a basis of calculation is that amount which when injected into a normal rabbit weighing 1 kg. reduces the blood sugar to below 0.045% within six hours and produces convulsions.

To my knowledge, the best product obtained prior to this present invention had a residual-nitrogen content of from 0.2 to 1.0 milligrams per unit of anti-diabetic activity, and was ordinarily higher than that, and also contained some inorganic salts, and in addition was frequently and variably unstable, and sometimes deteriorated unaccountably and unpredictably, so that its potency could not be relied upon. While the hormone is itself probably nitrogeneous, this residual-nitrogen content was almost wholly in the form of contaminating proteins or their split products; and this residual-nitrogen content, under certain conditions, caused unpleasant effects, such as sensitization and induration at the point of injection. The contaminating substances present, also included:—substances containing phosphorus, substances containing purine groups, and substances containing pyrimidine groups.

The residual-nitrogen content of the anti-diabetic product obtained by my invention is greatly reduced in comparison to that of previous products. It is not more than 0.1 milligram per unit of anti-diabetic activity, and is usually of the order of 0.005 to 0.05 milligram per unit of anti-diabetic activity; whereas no previous product of which I am aware has had a residual-nitrogen content as low as 0.1 milligram per unit of anti-diabetic activity. To obtain this degree of purity, several repeated processes of purification may sometimes be required. Probably at least some of this small amount of residual nitrogen is in the hormone itself, and is not in a contaminating substance; so that the resultant advantage in the reduction of nitrogenous contamination is in even greater proportion than these figures show. In addition, the product obtained according to my invention is substantially free from water-soluble impurities:—such as inorganic salts, substances containing phosphorus, substances containing purine groups, and substances containing pyrimidine groups,—which are noticeably present in the product which was obtained by the previously known methods. The final solution of the product obtained according to my invention is brilliantly clear, and in small quantities is practically as colorless as water, though in bulk it shows a light straw-color tinge; whereas previous products showed considerable color even in small quantities.

Thus it is possible to obtain a product which can be administered with maximum safety and maximum predetermination of its anti-diabetic effect. This product has a stability many times as great and a purity ranging from ten to one hundred times as great as the best product obtainable prior to my invention. This stability is so great that the product shows no appreciable diminution in potency after a lapse of over three months from the time of its preparation; and this purity is so great that out of many thousands of patients to whom the product has so far been administered, including some who exhibited sensitization and induration effects with the best products previously obtainable, to my knowledge not a single instance of sensitization or induration or any other deleterious effect from the product has been reported.

By reason of this great purity, the effect obtained on administration of the product is limited very closely if not wholly to the relief of the diabetic syndrome, without material undesirable unrelated effects—such as induration and sensitization.

In carrying out my invention, the pancreas is treated to leave behind the enzymes of the pancreas or inhibit their destructive action, the active anti-diabetic substance is separated free of the major part of the substances, largely nitrogenous, with which it was originally associated, and the anti-diabetic principle is then purified by separating it sufficiently free from contaminating and deleterious substances, largely nitrogenous, so that they do not interfere with the potency or stability of the anti-diabetic substance and so that the residual-nitrogen content is not in excess of 0.1 milligram per unit of anti-diabetic activity.

I have discovered that the stability of the solution heretofore regarded as the final product can be controlled, and that it is affected at least in part, by the hydrogen ion concentration of such solution. If the hydrogen ion concentration is within a $P_H$ range of from about 4 to 7, a deterioration of the anti-diabetic potency of the solution occurs at a rate dependent at least in part on the hydrogen ion concentration. Possibly this deterioration is in part due to a destructive action of contaminating nitrogenous matter present in the solution; but I have found that at least a large part of it is not the result of destruction of the hormone, but is the result of the slow formation from the solution of a precipitate containing the anti-diabetic hormone, thereby reducing the activity of the solution. The rate and extent of formation of this hormone-containing precipitate vary with the hydrogen ion concentration of the solution, and they increase as its isoelectric point is approached from either side. (The term "isoelectric point" is here used to indicate the $P_H$ at which certain substances in solution tend most strongly to come out of solution. The isoelectric point varies with different substances.) The lower the concentration of impurities in the solution, the more clearly delimited is this isoelectric point, the more rapid is the rate of formation of the precipitate, and the greater is the yield of the precipitate. This precipitate starts to form, under favorable conditions, at a $P_H$ of about 4, reaches a maximum at a $P_H$ of about 4.5 to 5.5, and is substantially completely redissolved at a $P_H$ of about 6.5 to 7. However, if the concentration of the impurities in the solution is so high that the precipitate, which would otherwise form, is held in solution, the solution can be diluted so that the precipitate will form.

In carrying out my invention, it is not necessary but it is advantageous to take a product such as that finally obtained by previous processes, and though purification of such a product can be effected by various methods, I prefer to do it by adjusting the hydrogen ion concentration, of a solution containing the hormone, to the vicinity of an isoelectric point which results in the separation of a precipitate containing such hormone or having such hormone associated with it. As one way of separating and obtaining the stable and pure anti-diabetic substance, this method of isoelectric precipitation of a substance containing the anti-diabetic principle or hormone makes profitable use of the very precipitate-forming tendency that previously caused trouble.

Although this method of isoelectric precipitation may be applied with good effect to solutions obtained earlier than the final one of previous processes, it is preferred to use it on solutions of previous final products, from which the great mass of contaminating matter has been removed by such prior processes; because the effectiveness of this method increases with the freedom of the hormone from associated contaminating substances in the solution from which the precipitation is made.

When using this method of isoelectric precipitation, I deliberately adjust the hydrogen ion concentration of the solution containing the anti-diabetic substance to the isoelectric point of the latter in order to precipitate it in very pure and very stable form and practically free of the contaminating substances, largely nitrogenous, with which it was associated in the solution. In other words, the hydrogen ion concentration is adjusted as nearly as possible to the isoelectric point of the substance or substances, which on precipitation from such solution include or have associated with them the anti-diabetic hormone, whether or not such substance or substances constitute such hormone. In this specification, and in some of the claims, the term "anti-diabetic substance" is used to denote generically the anti-diabetic hormone whether alone or in association with something else. The solution of anti-diabetic substance from which the isoelectric precipitation is made can be caused to be at the desired $P_H$ by controlling the prior process by which it was obtained; but if the $P_H$ is too low it can be raised by adding an alkali, preferably sodium hydroxide, until the vicinity of the isoelectric point is reached, while if it is too high an acid can be added, preferably hydrochloric acid. As the precipitate forms a variation may occur in the hydrogen ion concentration, but it is not necessary to maintain a constant $P_H$; for while the isoelectric point seems to be somewhere between 4.5 and 5.5 on the $P_H$ scale, or in other words $P_H$ 5±0.5, as nearly as I have been able to determine, the precipitate is obtained to a greater or less extent through the $P_H$ range 4 to 7, so that a hydrogen ion concentration at any point within this range can be used. The best results I have so far obtained have been with a $P_H$ between 4.5 and 5.5. After the $P_H$ has been adjusted as closely as possible to the isoelectric point, of the "anti-diabetic substance", the solution is allowed to stand to permit the formation of the precipitate. Several days or a week are preferably allowed for this, though a separable precipitate is obtained within a few hours. If the precipitate is slow in forming, or does not form at all, the solution is diluted, maintaining such hydrogen ion concentration as is necessary to make the precipitate appear. At intervals the precipitate is removed, as by filtration, and the hydrogen ion concentration is preferably readjusted to the optimum $P_H$ above mentioned whereby further amounts of the precipitate are obtained. To accelerate the formation of this precipitate, it is advantageous to chill the solution during this period of standing.

The precipitates thus obtained are dissolved in water containing an electrolyte, preferably either an acid or a base, using by preference hydrochloric acid as the acid or sodium hydroxide as the base. This solution makes it possible to administer the product hypodermically. The hydrogen ion concentration of the solution thus formed is adjusted to any desired $P_H$, preferably on the acid side of the isoelectric point. For most purposes, this lies outside of the precipitating $P_H$ range 4 to 7, so that the hormone is in solution, and it has been found that a $P_H$ of 3.5 is suitable for ordinary therapeutic purposes; but the $P_H$ may be lower if desired, and it is preferred to use a $P_H$ as low as 2, at which $P_H$ the amount of acid is not sufficient to produce undue stinging in administration, if hydrochloric acid is used. For special purposes, a higher $P_H$ may be used, either within such isoelectric range or above it. Solutions with a $P_H$ as high as 12 have been effectively used.

The final solutions I obtain are very stable and very pure. Apparently this great purification is due to the fact that the final precipitate of "anti-diabetic substance" contains only the hormone and some very closely associated or combined substance or substances having no appreciable injurious effect on the stability, potency, or anti-diabetic properties of the final product, and that the major part of the contaminating substances (proteins, split protein products, other nitrogenous substances, inorganic salts, etc.) remain in the solution and are separated from the anti-diabetic product.

The total number of units of potent anti-diabetic substance recovered by this method is sometimes as high as 90% of those in the solution before the precipitation. This varies with the completeness of the precipitation obtained and is increased;—by having a purer starting product; by increasing the standing period; by reducing the temperature during standing; and especially by getting closer to the isoelectric point. The loss in anti-diabetic activity may be made comparatively slight by exercising care on these points; and in any case it is far outweighed by the manifold increase obtained in the stability and purity of the product.

I am aware that Banting, Best, and Collip used the principle of isoelectric precipitation in their work at Toronto. But they used it for different purposes and with different effects. They used it with the idea of precipitating undesirables, and of leaving the anti-diabetic hormone in the solution and throwing away the precipitate obtained. On the other hand, I use it to precipitate and conserve the anti-diabetic product, and leave the undesirables in the solution; and I discard the solution when all of the anti-diabetic hormone has been separated from it, and preserve the precipitate.

Having thus fully described my invention, what I claim as new and desire to secure by Letters Patent is:—

1. The method of obtaining an active anti-diabetic substance, having the physiological and therapeutic characteristics and reactions of the anti-diabetic principle or hormone of the pancreas, in purified and stable form, and substantially free of the subtstances with which it was originally associated in the pancreas, which method comprises treating the pancreas to leave behind the enzymes of the pancreas or inhibit their destructive action, separating the active anti-diabetic principle free of the major part of the substances, largely nitrogenous, with which it was originally associated, and then purifying this active anti-diabetic principle by reducing the residual-nitrogen content to a point where it is not in excess of 0.1 milligram per unit of anti-diabetic activity.

2. The method of obtaining the active anti-diabetic principle or hormone of the pancreas substantially free of substances with which it was originally associated in the pancreas, which method comprises separating as a crude product the active anti-diabetic principle or hormone free from the major part of such substances, and then separating and obtaining the active anti-diabetic principle or hormone free from all residual nitrogen in excess of 0.1 milligram per unit of anti-diabetic activity.

3. The method of obtaining the active anti-diabetic principle or hormone of the pancreas substantially free of substances with which it was originally associated in the pancreas as claimed in claim 2, and making an aqueous solution of the anti-diabetic product that retains its anti-diabetic potency substantially constant for at least three months and when hypodermically administered relieves the diabetic syndrome.

4. The method of separating an anti-diabetic product from the pancreas, which method consists in extracting the pancreas with a solvent that takes up the active anti-diabetic principle or hormone without destroying it or inhibits its destruction by substances co-present with it in the pancreas, separating the solution from the pancreas residue and treating this solution to separate the active anti-diabetic principle or hormone from the major part of the contaminating substances, forming a solution containing said separated hormone and causing to be formed in the solution a precipitate, with not more residual nitrogen than 0.1 milligram per unit of anti-diabetic activity, which precipitate includes or has associated with it the active anti-diabetic principle or hormone whether or not such precipitate constitutes such hormone.

5. The method, as claimed in claim 4, with the added step of making a solution of the precipitate formed, which precipitate includes or has associated with it the active anti-diabetic principle or hormone.

6. A process of preparing an anti-diabetic product from the pancreas, which process consists in treating the pancreas to obtain the anti-diabetic principle or hormone and leave behind the enzymes of the pancreas or inhibit their destructive action, separating the anti-diabetic principle or hormone from the major part of the pancreas-residue, forming of the product containing the said anti-diabetic principle or hormone a solution containing said hormone and the then co-present matter and adjusting the hydrogen ion concentration of said solution to the vicinity of the isoelectric point of a substance, which, following upon the said adjustment, forms a precipitate including the anti-diabetic hormone, and separating and preserving the precipitate thus formed.

7. A process of purifying a product containing the anti-diabetic principle or hormone of the pancreas, which process consists in treating the pancreas to obtain a solution containing the active anti-diabetic principle or hormone substantially free from the major part of the substances with which it was associated in the pancreas, and then adjusting the hydrogen ion concentration of such solution to the vicinity of the isoelectric point of a substance which, following upon such adjustment, forms a precipitate including the active anti-diabetic principle or hormone, and separating from the liquid and preserving the precipitate thus formed.

8. A process of separating the active anti-diabetic principle or hormone of the pancreas from contaminating substances with which it was originally associated in the pancreas, which process comprises adjusting the hydrogen ion concentration of a solution containing such anti-diabetic principle or hormone to the vicinity of the isoelectric point of a substance which, following upon the said adjustment, forms a precipitate including the anti-diabetic principle or hormone, and separating from the liquid and preserving the precipitate thus formed.

9. A process of purifying the product containing the active anti-diabetic principle or hormone of the pancreas as set forth in claim 8, with the added step of forming of the separated precipitate so obtained a solution having a hydrogen ion concentration sufficiently far from such isoelectric point to prevent material precipitation.

10. A process of purifying a product containing the anti-diabetic hormone of the pancreas as set forth in claim 8, with the added step of forming of the separated precipitate so obtained a solution having a hydrogen ion concentration which is sufficiently on the acid side of such isoelectric point to prevent material precipitation.

11. A process of obtaining an anti-diabetic product from the pancreas substantially free of contaminating substances with which it was originally associated, which process comprises extracting the pancreas with a solvent that takes up the active anti-diabetic principle or hormone without destroying it or inhibits its destruction by enzymes co-present with it in the pancreas, separating the solution from the pancreas-residue and treating this solution to separate said hormone from the major part of the contaminating substances, producing further separation of said hormone from contaminating substances by fractional precipitation at varying concentrations of alcohol, and separating the fraction obtained between 80% and 90% alcohol concentration, forming a solution of said last-named fraction and adjusting the hydrogen ion concentration of said last-named solution to the vicinity of the isoelectric point of a substance which, following upon the said adjustment, forms a precipitate including the anti-diabetic hormone, and separating and preserving the precipitate thus formed.

12. A process of preparing an anti-diabetic product from the pancreas, which process consists in extracting the pancreas with a solvent that takes up the anti-diabetic hormone thereof without destroying it or prevents its destruction by enzymes such as trypsin co-present with it in the pancreas, separating the solution from the pancreas-residue, producing separation of said hormone from contaminating substances by fractional precipitation at varying concentrations of alcohol and preserving the precipitate obtained between 80% and 90% alcohol concentration, forming a solution of said last-named precipitate and adjusting the hydrogen ion concentration of the said last-named solution to the vicinity of the isoelectric point of a substance which, following upon the said adjustment, forms a precipitate including the anti-diabetic hormone, and separating and preserving the precipitate thus formed.

13. A process of preparing an anti-diabetic product from the pancreas, which process consists in extracting the pancreas with a solvent that takes up the anti-diabetic hormone thereof without destroying it or prevents its destruction by enzymes such as trypsin co-present with it in the pancreas, separating the solution from the pancreas-residue and treating it to separate said hormone from the major part of the contaminating substances, forming a solution containing said separated hormone and the then co-present matter and adjusting the hydrogen ion concentration of said last-named solution to the vicinity of the isoelectric point of a substance which, following upon the said adjustment, forms a precipitate including the anti-diabetic hormone, and separating and preserving the precipitate thus formed.

14. A process of preparing an anti-diabetic product from the pancreas, which process consists in extracting the pancreas with a solvent that takes up the anti-diabetic principle or hormone thereof without destroying it or prevents its destruction by enzymes such as trypsin co-present with it in the pancreas, obtaining separate from the pancreas-residue a solution containing said hormone and the then co-present matter and adjusting the hydrogen ion concentration of said solution to the vicinity of the isoelectric point of a substance, which, following upon the said adjustment, forms a precipitate including the anti-diabetic hormone, and separating and preserving the precipitate thus formed.

15. A method of purifying the active anti-diabetic substance of the pancreas while in solution, which method comprises adjusting the hydrogen ion concentration of the solution to the vicinity of the isoelectric point of said substance in order to precipitate it, and then separating it from the solution and preserving it.

16. A process of separating a substance containing the anti-diabetic hormone of the pancreas from contaminating substances, which process consists in adjusting the hydrogen ion concentration of a solution of a pancreas-derived substance containing said hormone and other matter to a $P_H$ between 4 and 7 to produce a precipitate which includes said hormone but leaves behind in the solution the major part of the contaminating nitrogenous matter and inorganic salts, and separating this precipitate from the solution and preserving it.

17. A process of separating a substance containing the anti-diabetic hormone of the pancreas from contaminating substances, which process consists in adjusting the hydrogen ion concentration of a solution of a pancreas-derived substance containing said hormone and other matter to a $P_H$ between 4 and 7 to produce a precipitate which includes said hormone but leaves behind in the solution the major part of the contaminating nitrogenous matter and inorganic salts, separating this precipitate from the solution, and forming of this precipitate an aqueous solution with a hydrogen ion concentration below $P_H$ 4.

18. A process of separating a substance containing the anti-diabetic hormone of the pancreas from contaminating substances, which process consists in adjusting the hydrogen ion concentration of a solution of a pancreas-derived substance containing said hormone and other matter to a $P_H$ between 4 and 7 to produce a precipitate which includes said hormone but leaves behind in the solution the major part of the contaminating nitrogenous matter and inorganic salts, separating this precipitate from the solution, and forming of this precipitate an aqueous solution with a hydrogen ion concentration outside the $P_H$ range from 4 to 7.

19. A process of purifying the active anti-diabetic substance of the pancreas, which process consists in adjusting the hydrogen ion concentration of a solution of a substance derived from the pancreas and containing said active anti-diabetic principle or hormone and other matter to $P_H$ $5\pm0.5$ to produce a precipitate which includes said anti-diabetic principle or hormone but leaves behind in the solution the major part of contaminating nitrogenous matter and inorganic salts, and separating this precipitate from the solution and preserving it.

20. A process of purifying the active anti-diabetic substance of the pancreas as set forth in claim 19 with the added step of forming of the final precipitate a solution with a hydrogen ion concentration on the acid side of $P_H$ 4.

21. An anti-diabetic product derived from the pancreas, which product has a residual-nitrogen content of not more than 0.1 milligram per unit of anti-diabetic activity, and upon hypodermic administration relieves the diabetic syndrome.

22. An anti-diabetic product derived from the pancreas, which product has a residual-nitrogen content of the order of 0.005 to 0.05 milligrams per unit of anti-diabetic activity, and upon hypodermic administration relieves the diabetic syndrome.

23. A solution of an anti-diabetic hormone derived from the pancreas, which solution has a hydrogen ion concentration of the acid side of $P_H$ 4, and upon hypodermic administration relieves the diabetic syndrome.

24. A solution of an anti-diabetic hormone derived from the pancreas, which solution has a hydrogen ion concentration outside the $P_H$ range 4 to 7, has a residual-nitrogen content of not more than 0.1 milligrams per unit of anti-diabetic activity, and upon hypodermic administration relieves the diabetic syndrome.

25. A solution of an anti-diabetic product derived from the pancreas and containing the anti-diabetic principle or hormone of the pancreas, which solution when hypodermically administered relieves the diabetic syndrome, is sufficiently free from injurious substances for repeated administration, and has an anti-diabetic potency which remains substantially constant for at least three months from the time of its preparation.

26. An anti-diabetic product which contains the anti-diabetic principle or hormone of the pancreas, which product when hypodermically administered relieves the diabetic syndrome without material unrelated effects, is precipitable from water solution at an isoelectric point in the $P_H$ range 4.5 to 5.5, and has a residual-nitrogen content of not more than 0.1 milligrams per unit of anti-diabetic activity.

27. An anti-diabetic product derived from the pancreas and containing the active anti-diabetic principle or hormone of the pancreas, which product is substantially free from one or more of the following: substances containing phosphorus, substances containing purine groups, substances containing pyrimidine groups.

28. An anti-diabetic product containing the active anti-diabetic principle or hormone of the pancreas, which product has an anti-diabetic potency that remains substantially constant for at least three months from the time of its preparation and when administered relieves the diabetic syndrome.

29. A substance as claimed in claim 28, in which the residual-nitrogen content is not more than 0.1 milligram per unit of anti-diabetic activity.

30. A substance as claimed in claim 28, in which the residual-nitrogen content is of the order of 0.005 to 0.05 milligram per unit of anti-diabetic activity.

In witness whereof, I have hereunto set my hand at Indianapolis, Indiana, this 9th day of June, A. D. one thousand nine hundred and twenty four.

GEORGE B. WALDEN.